No. 650,096. Patented May 22, 1900.
C. F. RODDE.
RECORDER FOR RAPID AUTOMATIC TELEGRAPHY.
(Application filed Feb. 3, 1900.)
(No Model.)
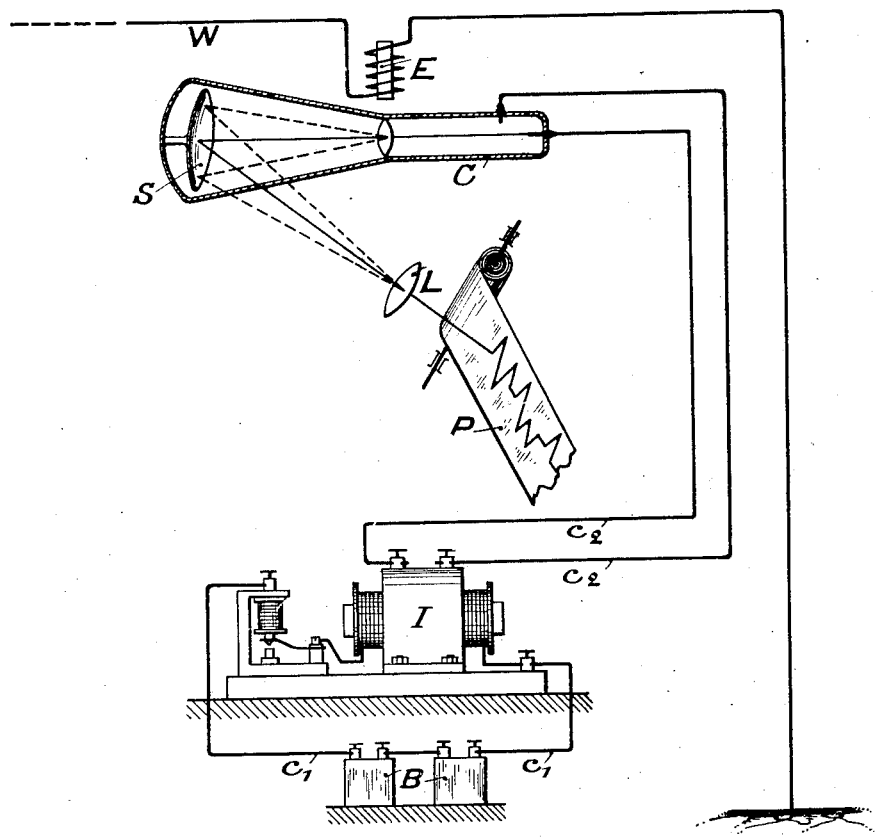
WITNESSES
C. J. Schmidt.
Max W. Zabel.
BY ATTORNEYS
INVENTOR
CARL F. RODDE
Charles A. Brown + Cragg

UNITED STATES PATENT OFFICE.

CARL FRIEDRICH RODDE, OF BERLIN, GERMANY, ASSIGNOR TO SIEMENS & HALSKE AKTIEN-GESELLSCHAFT, OF SAME PLACE.

RECORDER FOR RAPID AUTOMATIC TELEGRAPHY.

SPECIFICATION forming part of Letters Patent No. 650,096, dated May 22, 1900.

Application filed February 3, 1900. Serial No. 3,776. (No model.)

*To all whom it may concern:*

Be it known that I, CARL FRIEDRICH RODDE, engineer, a subject of the German Emperor, residing at Markgrafenstrasse 94, Berlin, Germany, have invented a certain new and useful Improvement in Recorders for Rapid Automatic Electric Telegraphy, (Case No. 1,) of which the following is a full, clear, concise, and exact description, reference being had to the accompanying drawings, forming a part of this specification.

The present invention relates to improvements in recorders for rapid automatic electric telegraphy.

As is known to those conversant with the art, the general system of rapid automatic telegraphy hitherto in use consists of a transmitting instrument in which a record-strip previously provided with a row or rows of perforations indicating the different letters, words, or signs that are to be transmitted is fed, thus making and breaking electric contacts or generally effecting electric connections adapted to transmit the signs indicated to the receiving-station, and of a recording instrument adapted to receive and retain the signs thus transmitted. It is also known that a receiving instrument or recorder for impulses of electric current thus transmitted can be obtained by allowing such currents to flow through an electromagnet and by the variations of attraction or repulsion thus obtained to vary the position of a mirror, by which a ray of light is deflected, such deflections being registered and retained by a strip of photographic paper sensitive to light, which by suitable means is drawn past an opening traversed by said ray of light. My invention relates to recorders of this kind, and more especially to a novel system of deflecting the ray by which the signs are to be imprinted on the recording-strip of sensitive paper.

The invention consists in employing cathode-rays in the place of ordinary light-rays, and I propose to take advantage of the property possessed by cathode-rays to vary their direction when the direction or intensity of magnetic field is varied through which they pass. I thus obtain the advantage over the above-cited older systems of recorders that with my system it becomes superfluous to move any mechanical parts, such as a mirror and its fastenings.

The accompanying drawing is a diagrammatical representation of the recorder according to this invention, showing only those parts which strictly pertain to the present invention, since all other parts, though necessary for the practical performance of actual telegraphy, are well known to those conversant with the present state of the art.

In the drawings, B represents a local battery or other suitable source of electricity. The battery B is connected in the usual way by suitable conductors $c'$ to the primary windings of an induction-coil I, furnished with a suitable interrupter. The secondary windings of said induction-coil are in their turn connected in the usual way by suitable conductors $c^2$ to the electrodes of glass bulb C, arranged in the usual way for the production of cathode-rays.

W is a wire coming from the transmitting-station and conveying the impulses of current representing the signs that are to be recorded.

In the actual use of the instrument a relay might be employed to call up the operator and to perform other functions necessary or useful in electric telegraphy; but as these functions do not directly appertain to the purpose and use of the herein-described recording instrument they are not shown.

In the conductor W, conveying the current-impulses, an electromagnet E is inserted, which is placed in the vicinity of the cathode-ray bulb, so as to deflect the cathode-rays produced therein. At the end of the bulb a fluorescent screen is provided, on which a luminous spot is produced where the screen is struck by the rays. In a suitable distance from the said screen a system of lenses L is provided, by which the light emitted by the luminous spot is projected and concentrated onto a strip of sensitive paper P, suitable means being provided for feeding the paper past the place where it is struck by the pencil of light. As soon as a current passes through the electromagnet E the cathode-rays are deflected by the magnetic field thus created, and the luminous spot on the fluorescent screen S is therefore shifted, correspondingly shifting the image projected on the sensitive paper. It is evident that by suitably varying the intensity of interrupting or reversing the exciting-current a curved line or a series of differently-located lines or dots will be registered on the paper, and by employing any one system of known telegraphic alphabets messages can be recorded by this means and can be obtained by developing the image produced on the paper in the ordinary way.

Having now particularly described and ascertained the nature of my said invention and in what manner the same is to be performed, I declare that what I claim is—

1. A recording instrument for rapid automatic telegraphy consisting of means for producing cathode-rays in combination with an electromagnet adapted to deflect same and of means for registering such deflections.

2. A recording instrument for automatic rapid-transmission telegraphy consisting of the combination with a glass bulb adapted for the production of cathode-rays, means for producing the same, an electromagnet excited by the transmitting-current and placed in the proximity of said bulb and a fluorescent screen contained in said bulb of a suitable photographic camera for registering the deflections of said cathode-rays caused by said exciting-current.

3. A recording instrument for rapid automatic telegraphy consisting of the combination of a glass bulb adapted for the production of cathode-rays an electromagnet inserted in the conductor conveying the current impulses coming from the transmitting-station said magnet being placed in the proximity of said bulb a fluorescent screen placed in said bulb with suitable means for recording the movements of the luminous spot caused by said cathode-rays on said fluorescent screen.

4. A recorder for rapid automatic telegraphy consisting of the combination of a glass bulb adapted for the production of cathode-rays and containing a fluorescent screen upon which said cathode-rays are projected and cause a luminous spot to appear and of means for producing such rays with an electromagnet excited by the transmitted current impulses and placed in the proximity of said bulb so as to deflect said cathode-rays and to cause movements of said luminous spot when variously excited, a photographic camera adapted to retain an image of said luminous spot and with means for continuously moving the sensitive material in said camera.

In witness whereof I have hereunto subscribed my name this 2d day of January, A. D. 1900.

CARL FRIEDRICH RODDE.

Witnesses:
ERNST DILLAN,
RICHARD LEFFSON.